United States Patent [19]

de Mollerat du Jeu

[11] Patent Number: 5,394,243

[45] Date of Patent: Feb. 28, 1995

[54] AXIAL SPEED-MEASURING DEVICE INCLUDING A FABRY-PEROT INTERFEROMETER

[75] Inventor: Christian de Mollerat du Jeu, Aix en Provence, France

[73] Assignee: Societe Europeenne de Systemes Optiques (S.E.S.O.), Plaisir, France

[21] Appl. No.: 31,663

[22] Filed: Mar. 15, 1993

[30] Foreign Application Priority Data

Mar. 16, 1992 [FR] France ................... 92 03089

[51] Int. Cl.⁶ .................................................. G01B 9/02
[52] U.S. Cl. ................................... 356/352; 356/28.5
[58] Field of Search ................ 356/285, 345, 349, 352

[56] References Cited

U.S. PATENT DOCUMENTS 5,088,815 2/1992 Garnier et al. ...................... 356/352

FOREIGN PATENT DOCUMENTS 009533 4/1980 European Pat. Off. .
467127 1/1992 European Pat. Off. .

OTHER PUBLICATIONS

Hemsing, "Velocity Sensing Interferometer (VISAR) Modification", *Rev. Sci. Instrum.*, vol. 50, No. 1, Jan. 1979, pp. 73–78.

*Primary Examiner*—Samuel A. Turner
*Attorney, Agent, or Firm*—Bell, Seltzer, Park & Gibson

[57] ABSTRACT

A device for measuring axial speed by means of a light source emitting a parallel ray beam through an optical system comprising a Fabry-Perot interferometer, spectrum offset optical means, and an interference filter, the optical system being used for receiving backscattered light flux, and the device further comprising at least one photodetector on which the light flux leaving the optical system is focused, the device serving, in particular, to measure axial wind speed at distances lying between about 10 meters and about 100 meters.

14 Claims, 3 Drawing Sheets

AXIAL SPEED-MEASURING DEVICE INCLUDING A FABRY-PEROT INTERFEROMETER

BACKGROUND OF THE INVENTION

1. Field of the Invention

The invention relates to a device for measuring the axial speed of a moving medium or body, in particular of a gas, the device being of the type comprising a light source associated with collimating optics for emitting a beam of parallel rays towards an observed volume, and at least one photodetector associated with focusing optics for receiving backscattered light flux and delivering a signal corresponding to the intensity of the received light flux.

2. Description of the Related Art

Devices of this type have already been used for determining the concentration of a gas present in an observed volume, on the basis of the way the gas absorbs the light flux at certain wavelengths characteristic of the gas.

Proposals have also been made for "lidar" type systems for measuring meteorological parameters such as cloud altitude, wind speed and direction, temperatures at various different altitudes, etc. To do this, it is necessary to make use either of a plurality of laser generators, or a plurality of receivers, or else to change the wavelengths at which the laser generators emit light and/or the wavelengths to which the receivers are tuned, and that is often lengthy and difficult in practice.

SUMMARY OF THE INVENTION

An object of the invention is to provide a device that is simple, compact, and accurate, and that enables axial speeds to be measured, in particular gas speeds, without being subjected to the above-mentioned drawbacks.

To this end, the present invention provides an axial speed-measuring device comprising a light source associated with collimating optics for emitting a beam of parallel rays in a given direction, at least one photodetector associated with focusing optics to receive backscattered light flux and to deliver a signal corresponding to the intensity of the received light flux, and the same optical system used both for emitting the above-specified beam and for receiving the backscattered light flux, said optical system comprising a Fabry-Perot interferometer transforming the spectrum of the emitted beam into a line spectrum, and spectrum offset optical means for providing a spectrum offset between the emitted light beam and the backscattered light flux.

The spectrum offset produced in the optical system of the device of the invention is defined by construction and is therefore fixed. Depending on circumstances, the spectrum offset that results from the axial component of the speed of an observed target is added to or subtracted from the fixed spectrum offset produced in the optical system. As seen by the photodetector through the Fabry-Perot interferometer, the resulting spectrum offset gives rise to a change in the intensity of the output signal from the photodetector.

The device of the invention thus makes it possible to measure the spectrum offset between the emitted beam and the backscattered beam as caused by the component of the speed of the target along the optical axis (Doppler effect), while using a single Fabry-Perot interferometer and without it being necessary to change the wavelengths to which the interferometer is tuned. Furthermore, the measurements performed are independent of variations in the tuning of the Fabry-Perot interferometer that are due to temperature variations, since the go-and-return paths of the light both pass through the interferometer, thereby making it possible to cancel the effects of such variations.

In a first embodiment of the invention, the spectrum offset means comprise angular deflection means for deflecting the emitted beam and/or the backscattered flux, said angular offset means being such that the emitted beam leaves parallel to the axis of the optical system and that the angles of incidence of the emitted beam and of the backscattered flux on the Fabry-Perot interferometer are different from each other.

For example, said angular deflection means may be constituted by prisms or by a mirror having facets.

An appropriate choice of angles of incidence for the emitted beam and for the backscattered beam on the Fabry-Perot interferometer makes it possible to measure a wide range of speeds, e.g. about $-250$ meters per second (m/s) to about $+250$ m/s, without the interferometer or said angles of incidence needing any adjustment. As a result the device of the invention is very convenient in use.

Typically, the difference between the above-mentioned angles of incidence is of the order of a milliradian.

According to another particular advantageous feature of the invention, the angle of incidence of the emitted beam on the Fabry-Perot interferometer is non-zero and the deflection optical means comprise three different deflection zones, one of which directs the emitted beam parallel to the axis of the optical system and the other two of which share the backscattered flux into two differently-deflected fractions so as to have different angles of incidence on the Fabry-Perot interferometer, one of said angles being greater than and the other of said angles being less than the angle of incidence of the emitted beam, the device comprising two photodetectors onto which said fractions of backscattered flux are focused on leaving the Fabry-Perot interferometer.

Under such conditions, the spectrum offset between the emitted beam and the backscattered beam due to a speed component of the gas along the optical axis gives rise to an increase in the backscattered flux received by one of the photodetectors and to a decrease in the backscattered flux received by the other photodetector.

The variation in the ratio between these two fluxes is representative of the variation in the measured speed.

By taking the ratio of the difference and the sum of the signals provided by the two photodetectors, a signal is obtained which corresponds to the axial speed of the gas and which is independent of overall variations in the intensity of the light fluxes.

In a variant of the invention, the spectrum offset means comprise local variations in the thickness of the Fabry-Perot interferometer in the zones through which the emitted beam and/or a fraction of the backscattered flux pass.

These local variations in thickness may be the result of depositing silica on the glass of an interferometer plate. Typically, these extra thicknesses are of the order of about 10 nanometers.

In this variant, the emitted beam and the backscattered flux remain parallel to each other and to the axis of the optical system.

According to another characteristic of the invention, the above-mentioned optical system also comprises an interference filter, placed after the spectrum-shifting optical means in the emission direction.

The interference filter makes it possible to limit the wavelength passband and thus to reduce background noise.

The light source used is a continuous or pulsed laser diode or a low power pulsed laser generator (a few mW), or a bulb, or a flash bulb. Typically, the duration of the emitted pulses is a few nanoseconds and the repetition frequency may lie in the range 10 Hz to 10 kHz.

Preferably, the optical system also comprises an afocal objective lens for emitting the light flux and for receiving the backscattered flux. When the device uses a pulsed light source, a single afocal objective lens is used for emission and for reception. When the device uses a continuous light source, it comprises an afocal objective lens for emission and another afocal objective lens for reception, together with a diaphragm enabling depth of field to be limited, the two objective lenses being disposed side-by-side.

Advantageously, the optical system comprising the Fabry-Perot interferometer, the spectrum offsetting optical means, and the interference filter is carried by a chassis that includes opaque partitions isolating the emitted light beam and the backscattered flux from each other.

The outputs of the photodetectors are connected to a data processing system which is programmed to calculate a speed parallel to the axis of the optical system on the basis of the signals provided by said photodetectors.

In particular, when using a laser diode having a power of about 1 milliwatt, the invention makes it possible to measure wind speeds at distances lying in the range about 10 meters (m) to about 100 m, said speeds being radial relative to the observation point.

The invention is also applicable to measuring axial speeds in an arbitrary medium, e.g. steam or an aerosol or of a moving body, e.g. in flight.

DESCRIPTION OF THE PREFERRED EMBODIMENT

Figure 1:
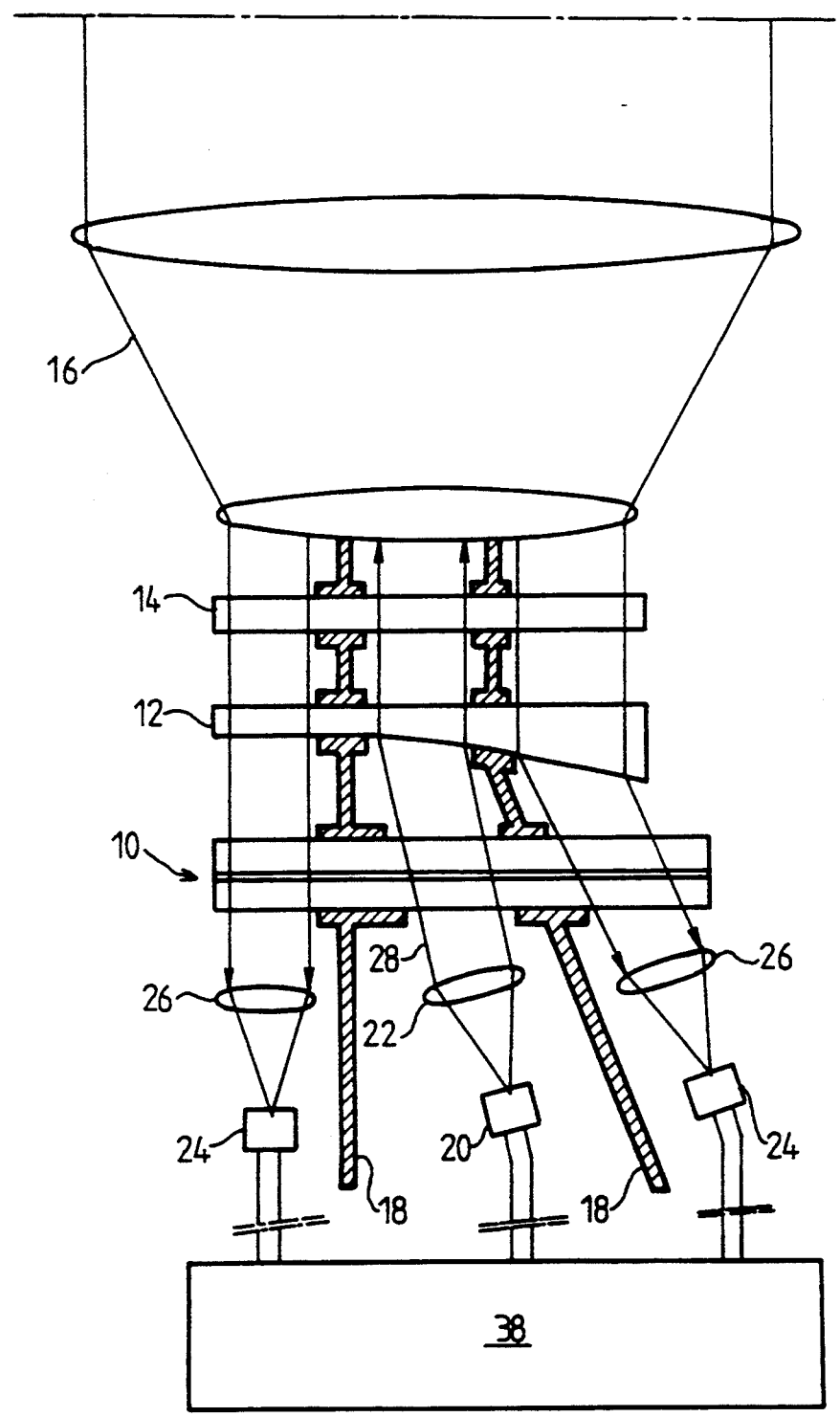
FIG. 1 is a diagram of a preferred embodiment of the device of the invention.

The device of the invention as shown in FIG. 1 essentially comprises a centered optical system constituted by a Fabry-Perot interferometer designated by the reference 10, light beam deflection means 12 constituted by a prism in the example shown, a differential filter 14, and preferably an afocal objective lens 16, with the axes of the interferometer 10, of the interference filter 14, and of the afocal objective lens 16 coinciding.

These elements are carried and positioned by a chassis that includes opaque partitions 18 that, in the optical system, serve to delimit a central transmission path for the light beam emitted by a light source 20 associated with collimating optics 22, and two side paths for transmitting the backscattered flux to photodetectors 24 associated with focusing optics 26.

The light beam emitted by the source 20 and leaving the optics 22 is a parallel-ray beam that strikes the Fabry-Perot interferometer 10 at an angle of incidence that is small relative to the axis of the optical system. On leaving the interferometer 10, the light beam 28 is transformed into a beam having a line spectrum and deflected by the prism 12 so as to be parallel with the axis of the optical system, thereby passing through the interference filter 14 with zero incidence.

The light beam leaving the interference filter 14 and the afocal objective lens 12 is backscattered by particles in suspension in the air (Mie diffusion) or by the gas molecules (Rayleigh diffusion) in the target volume, and a fraction of the backscattered flux is picked up by the afocal lens 16 and is transmitted via the interference filter, the prism 12, and the Fabry-Perot interferometer 10 to the photodetectors 24 on which it is focused by the optics 26.

As shown in exaggerated manner in FIG. 1, the prism 12 comprises three different deflection zones, comprising a central zone through which the emitted beam 28 passes and which serves to direct said beam so that it is parallel to the axis of the optical system, and two side zones, one of which transmits the backscattered flux without deflecting it while the other transmits the backscattered flux with greater deflection than that applied to the emitted beam.

In other words, the angle of incidence of the light beam 28 emitted onto the Fabry-Perot interferometer 10 is greater than the angle of incidence on said interferometer of the backscattered flux going towards the lefthand photodetector 24, and is smaller than the angle of incidence on said interferometer of the backscattered flux going towards the righthand photodetector 24.

As a result, a spectrum offset between the emitted beam and the backscattered flux (said spectrum offset being due to the speed of backscattering particles or molecules on the axis of the optical system) will give rise to variation in the light flux intensities received by the two photodetectors 24, the flux received by one of the photodetectors increasing while the flux received by the other photodetector decreases.

This notion is explained in greater detail with reference to FIGS. 2 and 3.

Figure 2:
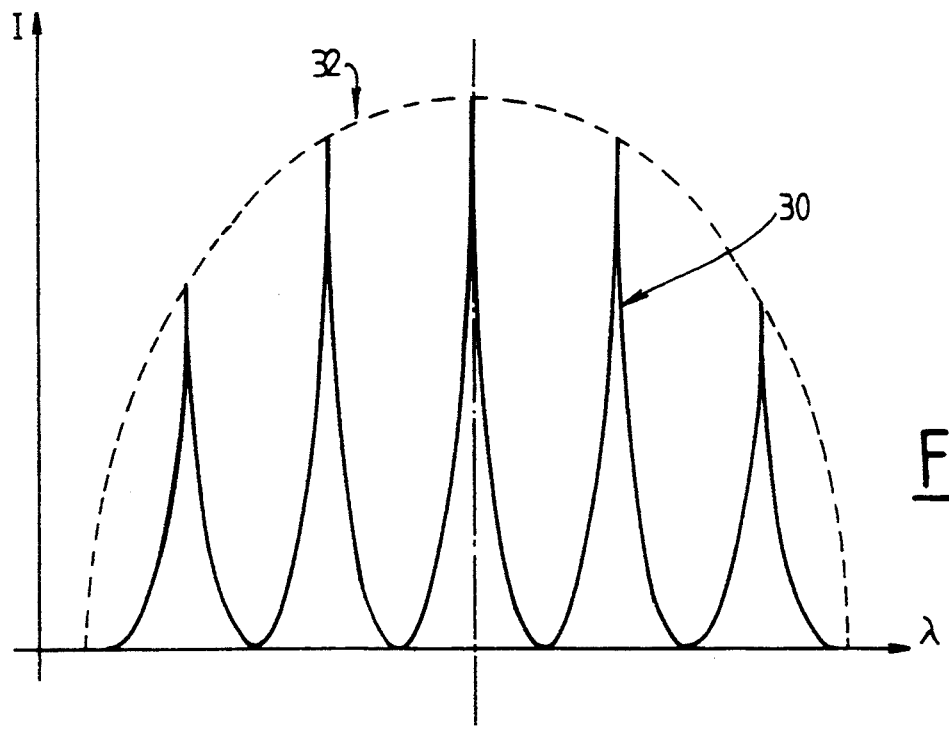
FIG. 2 is a graph showing the appearance of the light beam spectrum emitted by the device as a function of wavelength.

FIG. 2 is a diagram showing the spectrum as a function of wavelength λ of the light beam emitted by the device of the invention towards the observed volume.

This emitted spectrum is a line spectrum having lines 30 and is the result of the Fabry-Perot interferometer 10 transforming the continuous spectrum as emitted by the light source 20. This line spectrum is limited both in intensity and in wavelength by the interference filter 14, as indicated at 32 in FIG. 2.

The spectrum width of the line spectrum 30 is of the order of a few nanometers, with the light source 20 being a laser diode, for example, or a low power laser generator pumped by a diode.

Figure 3:
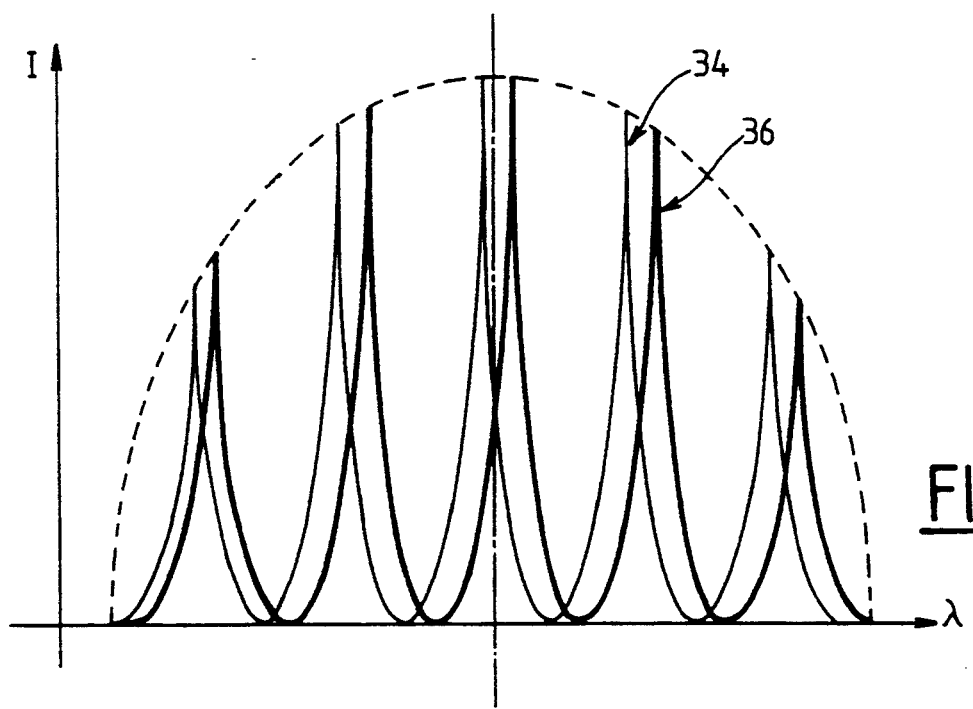
FIG. 3 is a graph showing the appearance of the spectra of the light beams transmitted to the photodetectors, again as a function of wavelength.

FIG. 3 shows, as a function of wavelength, the spectra transmitted by the Fabry-Perot interferometer 10 to the photodetectors, with reference 34 designating the spectrum transmitted to the lefthand photodetector 24 and referenced 36 designating the spectrum transmitted to the righthand detector. The lines in these two spectra 34 and 36 are offset to left and to right respectively relative to the lines in the emission spectrum 30, and for example they may be offset substantially symmetrically, with the offset being due to the progressively increasing angles of incidence on the Fabry-Perot interferometer of the backscattered flux as received by the lefthand photodetector, of the flux emitted by the light source 20 and its collimating optics, and of the backscattered flux as received by the righthand photodetector, respectively.

When the backscattered particles or molecules do not have a speed component along the axis of the optical system relative to the device of the invention, there is no wavelength spectrum offset between the emitted light spectrum and the backscattered light spectrum. The backscattered light fluxes transmitted by the Fabry-Perot interferometer to the photodetectors 24 then have certain values of intensity.

When the backscattering particles or molecules do have a speed component along the axis of the optical system relative to the device of the invention, a spectrum offset occurs between the spectrum lines as emitted and the spectrum lines as backscattered (Doppler effect). This offset takes place in one direction or the other as a function of the sign of said relative speed component. The backscattered flux spectrum is thus offset relative to the spectrum of the emitted beam, either towards the spectrum 34 or else towards the spectrum 36. This has the effect of increasing the backscattered flux transmitted by the interferometer 10 to one of the photodetectors while decreasing the backscattered flux as transmitted by the interferometer to the other photodetector.

The variation in the ratio between the signals provided by the photodetectors is representative of the value of the axial component of the relative speed of the backscattering particles or molecules, and of the sign of said component.

It is also possible to use the ratio between the difference and the sum of said signals.

The outputs of the photodetectors are connected, in practice, to the inputs of a data processing system 38 (FIG. 1) which is programmed to process the output signals from the photodetectors and also to control the operation of the light source 20.

When the light source is pulsed, it typically emits pulses having a duration of a few nanoseconds, over a wavelength lying in the range 650 nm to 900 nm, and at a repetition frequency that may lie in the range 10 Hz to 10 kHz.

In conventional manner, the distance between the device of the invention and the volume containing the backscattering particles or molecules whose speed is measured is determined from the go-and-return travel time of the light.

To compensate fully for the effects of ambient noise, the output signals from the photodetectors are measured during periods while the light source 20 is not emitting, and said measured noise is subsequently subtracted from the output signals of the photodetectors corresponding to the backscattering of the light pulses emitted by the source. The data processing system 30 is also programmed to perform time averaging of the measurements taken, so as to increase the accuracy of said measurements.

When using a continuous light source, it emits at a power of a few tens of mW in the visible or the UV spectrum. In conventional manner, the distance between the device and the measurement volume is determined by the depth of field of the receiving afocal objective lens.

Figure 4:
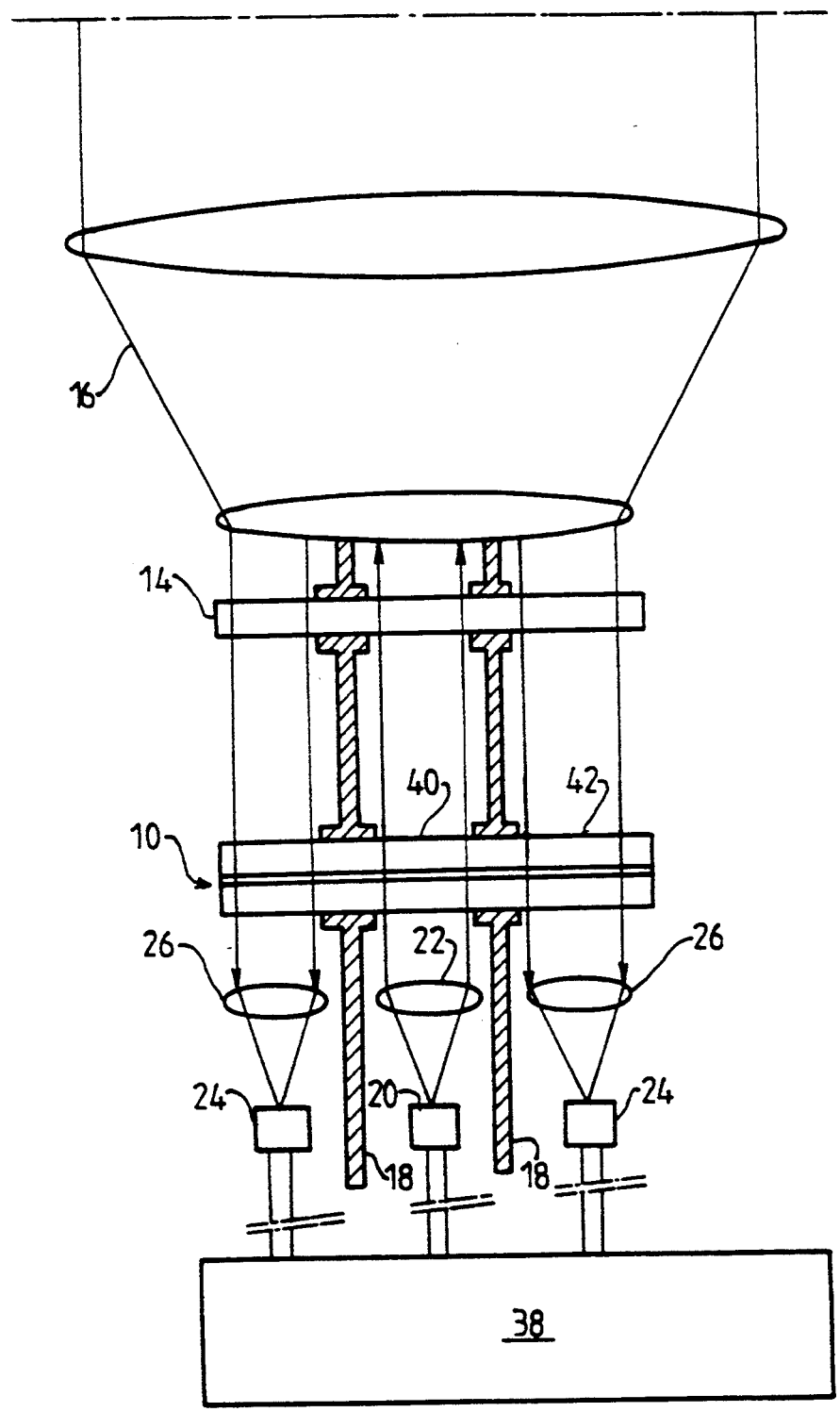
FIG. 4 is a view similar to FIG. 1 showing a variant of the present invention.

FIG. 4 shows a variant device of the invention in which the light beam emitted by the source 20 and passing through the Fabry-Perot interferometer 10 and the fractions of backscattered light flux picked up by the optical system are parallel to the optical system axis, with the spectrum shift in the optical system then being caused by local variations in the thickness of a glass plate of the Fabry-Perot interferometer.

The FIG. 4 device thus comprises substantially the same elements as the FIG. 1 device, apart from the prism 12. The optics 22 for collimating the emitted beam and the optics 26 for focusing the fractions of backscattered flux have their axes parallel to the axis of the optical system constituted by the interferometer 10, the interference filter 14, and the afocal objective lens 16.

A central portion of the interferometer 10 through which the collimated light beam from the optics 22 passes includes a local region of extra thickness given reference 40 and formed, for example, by depositing silica on one of the glass plates of the interferometer. Similarly, the portion of the interferometer 10 that conveys the fraction of backscattered flux directed onto the righthand photodetector 24 also includes a local region of extra thickness 42, which is thicker than the extra thickness 40 in the central portion of the interferometer.

The local regions of extra thickness 40 and 42 on the glass plate of the interferometer produce exactly the same effect as the angular deflection means 12 in the FIG. 1 embodiment. The operation of the device shown in FIG. 4 is therefore identical to that of the device shown in FIG. 1.

The device of the invention forms a block that is very compact, thereby making it easy to mount pivotally for the purpose of scanning a relatively large volume.

In addition, such compactness also makes it possible to mount the device on a mobile (e.g. a vehicle, a boat, an airplane, or a helicopter).

The invention also provides for the number of photodetectors used being greater than two, for example the number may be equal to three when it is desired to determine the temperature of the atmosphere at a given altitude, since temperature variations give rise to variations in the width of the backscattered spectrum lines which in turn give rise to variations in the intensities of the output signals from the photodetectors.

The device of the invention need include only one photodetector for receiving the backscattered flux. Under such circumstances, only the emitted beam or the backscattered beam is subjected to spectrum shifting by the optical system. The measurement may then relate to fluctuations in the backscattered signal thus making it possible with appropriate signal processing to determine the amount of turbulence in the air or the presence of aerosols.

I claim:

1. An axial speed-measuring device comprising a light source associated with collimating optics for emitting a beam of parallel rays in a given direction, at least one photodetector associated with focusing optics to receive backscattered light flux and to deliver a signal corresponding to the intensity of the received light flux, and the same optical system used both for emitting the above-specified beam and for receiving the backscattered light flux, said optical system comprising a Fabry-Perot interferometer transforming the spectrum of the emitted beam into a line spectrum, and spectrum offset optical means for providing a spectrum offset between the emitted light beam and the backscattered light flux.

2. A device according to claim 1, in which the spectrum offset means comprise angular deflection means for deflecting the emitted beam and/or the back-scattered flux, said angular offset means being such that the emitted beam leaves parallel to the axis of the optical system and that the angles of incidence of the emitted beam and of the backscattered flux on the Fabry-Perot interferometer are different from each other.

3. A device according to claim 2, in which the difference between the above-mentioned angles of incidence is of the order of a milliradian.

4. A device according to claim 2, in which the angle of incidence of the emitted beam on the Fabry-Perot interferometer is non-zero and the deflection optical means comprise three different deflection zones, one of which directs the emitted beam parallel to the axis of the optical system and the other two of which share the backscattered flux into two differently-deflected fractions so as to have different angles of incidence on the Fabry-Perot interferometer, one of said angles being greater than and the other of said angles being less than the angle of incidence of the emitted beam, the device comprising two photodetectors onto which said fractions of backscattered flux are focused on leaving the Fabry-Perot interferometer.

5. A device according to claim 2, in which the angular deflection optical means are constituted by prisms or by a mirror having facets.

6. A device according to claim 1, in which the spectrum offset means comprise local variations in the thickness of the Fabry-Perot interferometer in the zones through which the emitted beam and/or a fraction of the backscattered flux pass.

7. A device according to claim 1, in which the said optical system also includes an interference filter placed after the spectrum offset optical means in the emission direction.

8. A device according to claim 1, in which the said optical system also comprises at least one afocal objective lens for emission and for reception.

9. A device according to claim 1, in which the said optical system is carried on a chassis that includes opaque partitions isolating the emitted light beam and the backscattered fluxes from one another.

10. A device according to claim 1, in which the light source is a low power pulsed laser generator or a pulsed or continuous laser diode.

11. A device according to claim 1, in which the light source emits pulses having a duration of a few nanoseconds, at a repetition frequency of the order of 10 Hz to 10 kHz.

12. A device according to claim 1, in which said at least one photodetector is connected to a data processing system programmed to calculate a speed parallel to the axis of the optical system on the basis of the signals provided by the photodetector.

13. A device according to claim 1, wherein one of said at least one photodetectors comprises means for measuring variations in the width of the lines in the backscattered flux.

14. A device according to claim 1, forming a compact assembly that is pointable to scan a volume.

* * * * *